(12) United States Patent
Sen et al.

(10) Patent No.: US 6,593,440 B2
(45) Date of Patent: Jul. 15, 2003

(54) PALLADIUM (II) CATALYZED POLYMERIZATION OF NORBORNENE AND ACRYLATES

(75) Inventors: Ayusman Sen, State College, PA (US); Smita Kacker, Bridgewater, NJ (US); April D. Hennis, Ashland, VA (US); Jennifer D. Polley, Chapel Hill, NC (US)

(73) Assignee: Penn State Research Foundation, University Park, PA (US)

( * ) Notice: Subject to any disclaimer, the term of this patent is extended or adjusted under 35 U.S.C. 154(b) by 0 days.

(21) Appl. No.: 09/930,197

(22) Filed: Aug. 16, 2001

(65) Prior Publication Data

US 2002/0040115 A1 Apr. 4, 2002

Related U.S. Application Data

(60) Continuation-in-part of application No. 09/565,137, filed on May 5, 2000, now Pat. No. 6,300,440, which is a division of application No. 09/990,070, filed on Jun. 17, 1998, now Pat. No. 6,111,041.
(60) Provisional application No. 60/050,107, filed on Jun. 18, 1997.

(51) Int. Cl.$^7$ .................................................. C08J 36/00
(52) U.S. Cl. ........................ 526/281; 526/172; 526/328; 526/329; 526/319; 526/329.7; 526/171
(58) Field of Search ................................. 526/172, 328, 526/329, 319, 329.7, 281, 171

(56) References Cited

U.S. PATENT DOCUMENTS

| 3,697,490 A | 10/1972 | Starmer ................. 260/80.76 |
| 4,849,488 A | 7/1989 | Starzewski ................. 526/193 |
| 6,034,259 A | 3/2000 | Brookhart et al. ........... 556/137 |
| 6,057,466 A | 5/2000 | Starzewski ................. 556/19 |

FOREIGN PATENT DOCUMENTS

| EP | 0 837 079 A2 | 4/1998 |
| JP | 04063810 A | 2/1992 |

OTHER PUBLICATIONS

Coca et al Macromolecules, 1997, 30, 6513–16 "Block copolymers by transformation of living ring–opening metathesis polymerization into controlled/living atom transfer radical polymerization".*

* cited by examiner

*Primary Examiner*—Tatyana Zalukaeva
(74) *Attorney, Agent, or Firm*—Anthony J. DeLaurentis PA

(57) ABSTRACT

Homopolymers or copolymers of acrylates, homopolymers or copolymers of norbornenes, and copolymers of acrylates with norbornenes, may be prepared by contacting acrylate and/or norbornene monomer reactant under polymerization conditions and in the presence of a solvent with a catalyst system consisting essentially of a Pd(II) dimer component having the formula: $[(L)Pd(R)(X)]_2$, where L is a monodentate phosphorus or nitrogen ligand, X is an anionic group, and R is an alkyl or aryl group.

5 Claims, No Drawings

PALLADIUM (II) CATALYZED POLYMERIZATION OF NORBORNENE AND ACRYLATES

RELATED APPLICATIONS

This application is a continuation-in-part of Ser. No. 09/565,137, filed May 5, 2000, now U.S. Pat. No. 6,300,440, which is a division of Ser. No. 09/990,070, filed Jun. 17, 1998, now U.S. Pat. No. 6,111,041, which claims the benefit of U.S. Provisional No. 60/050,107, filed Jun. 18, 1997.

FIELD OF THE INVENTION

This invention relates to a novel catalyst that is suitable for use in the homopolymerization of norbornenes, in the homopolymerization of acrylates, and in the copolymerization of norbornenes with acrylates. The invention relates, further, to a process for homopolymerizing norbornenes and acrylates using the present catalyst, to a process for copolymerizing norbornenes with acrylates using the present catalyst, and to novel copolymers of norbornenes with acrylates.

BACKGROUND OF THE INVENTION

Considerable interest has existed in the copolymerization of acrylates with norbornenes because of the potential benefits of combining the useful properties of the homopolymers of the two monomers. For example, polyacrylates are valued for their extreme hardness and adhesive properties, and are used to form clear, glass-like materials such as Lucite™ and Plexiglas™. Polynorbornenes, on the other hand, are capable of resisting high temperatures and, thus, typically are employed in applications that necessitate high-temperature stability.

Polymerization of acrylic derivatives is disclosed, for example, in U.S. Pat. No. 4,849,488. In that patent, certain phosphorus compounds are used as polymerization catalysts. Preferred acrylic derivatives that are polymerized in accordance with that patent are acrylates and methacrylates of monovalent and polyvalent alcohols. Copolymers of at least two different acrylic derivatives are also disclosed. There is no disclosure in that patent relevant to the possibility of copolymerizing an acrylic derivative with norbornene or a norbornene derivative.

Until the present invention, attempts to copolymerize acrylates with norbornenes have met with modest success because of a disparity in the mechanisms by which the respective monomers polymerize. U.S. Pat. No. 3,697,490, for example, discloses copolymers of alkoxy alkyl acrylates, alkyl acrylates and substituted norbornene, wherein the copolymers contain only about 0.5 to about 5.5 percent by weight substituted norbornene compounds. The copolymers described in that patent typically are prepared in batch reactions, or the monomers may be proportioned to a reactor containing water and other desired polymerization additives. The patent indicates that best results are generally obtained at polymerization temperatures in the range of 5° C. to 50° C. in the presence of water containing a free radical generating catalyst and surface active agents.

U.S. Pat. No. 6,034,259 broadly discloses a process for polymerizing ethylene, acyclic olefins, and/or selected cyclic olefins, and optionally selected olefinic esters or carboxylic acids. The polymerization reactions are catalyzed by selected transition metal compounds, and sometimes other co-catalysts. Also described in that patent is the synthesis of linear alpha-olefins by the oligomerization of ethylene using as a catalyst system a combination of a nickel compound having a selected alpha-diimine ligand and a selected Lewis or Bronsted acid, or by contacting selected alpha-diimine complexes with ethylene. That patent also discloses polymerization of substituted norbornenes using the disclosed alpha-diimine-containing catalysts systems.

Japanese publication JP040063810 relates to copolymers that contain units derived from three essential monomers, namely: (i) an acrylic ester and/or methacrylic ester monomer, (2) a monomer that possesses a norbornene skeleton, and (iii) a monomer that can be radical-polymerized with the monomer that contains the norbornene skeleton. The copolymers must contain from about 0.5 to about 35 mole % of units derived from radical-polymerizable monomer (iii). The compounds that are disclosed as being suitable for use as the monomer (iii) include esters of maleic acid and an aliphatic alcohol which contains from 1 to 12 carbon atoms, maleic anhydride, N-substituted maleimides, α-cyanocinnamic acid, esters of α-cyanocinnamic acid and an aliphatic alcohol which contains from 1 to 12 carbon atoms, and esters of fumaric acid and an aliphatic alcohol which contains from 1 to 12 carbon atoms. The copolymerization reaction that is described in the Japanese publication typically is conducted in the presence of a free radical polymerization initiator, such as acetyl peroxide, benzoyl peroxide, 2,2'-azobiscyclopropylpropionitrile, or the like.

Typically, acrylates polymerize in the presence of radical or anionic initiators, whereas norbornenes do not follow radical pathways and normally are polymerized by cationic or insertion mechanisms. Therefore, in order to affect the copolymerization of acrylates with norbornenes, it was necessary to develop a catalyst system that would be effective for polymerizing both types of monomers.

SUMMARY OF THE INVENTION

It is an object of the present invention to provide a catalyst system that is capable of copolymerizing acrylates with norbornenes.

It is another object to provide a catalyst system that is useful for the homopolymerization of both acrylate monomers and norbornenes.

It is yet another object to provide a novel catalyst system that is useful both for the homopolymerizing of acrylate monomers and norbornene monomers, and for the copolymerization of acrylates with norbornenes.

Still another object of the invention is to provide novel copolymers of acrylates with norbornenes.

DETAILED DESCRIPTION OF THE INVENTION

The above and other objects and advantages of the invention are accomplished in one embodiment by providing a Pd(II)-based catalyst system which homopolymerizes acrylates to high molecular weight polymers, which homopolymerizes norbornenes to polymers, and which copolymerizes acrylates with norbornenes to high molecular weight polymers. The copolymers prepared in accordance with this invention are characterized by advantages and properties attributable to the respective acrylate and norbornene monomers from which they are derived. The copolymers can be tailored in norbornene to acrylate ratio by varying the ratio of the respective monomers in the reaction mixture and by varying the ligands utilized in the catalyst system.

The copolymers can be prepared simply by reacting one or more acrylate monomers with one or more norbornene monomers in the presence of the present Pd(II)-based catalyst system. The acrylate and norbornene monomers are the only essential monomers, although additional monomers may be added to the polymerization mixture, provided that they do not interfere with the desired polymerization. Thus, while there may be some instances where it would be desirable to add monomers that can be radical-polymerized with the norbornene monomer, such as the monomers described above in connection Japanese publication JP040063810 as radical-polymerizable monomer (iii), it is preferred to prepare the copolymers of the present invention in the absence of such added monomers.

As used in this specification and claims, the terms "acrylates" is meant to include compounds of the general formula $H_2C=CHCOOR$, where R is an alkyl group, such as methyl ($CH_3$), ethyl ($CH_2CH_3$), propyl ($CH_2CH_2CH_3$), n-butyl ($CH_2CH_2CH_2CH_3$) or t-butyl ($C-(CH_3)_3$), or an aryl group, such as phenyl ($C_6H_6$) or p-tolyl ($C_7H_8$). Other acrylates which do not conform to the above formula, but which are nonetheless suitable for use in the present invention and are intended to be included within the scope of the term "acrylates", include such acrylates as 2-hydroxy ethyl methacrylate and methyl methacrylate. Specific, non-limiting examples of acrylates contemplated for use in the present invention include methyl acrylate, ethyl acrylate, n-propyl acrylate, n-butyl acrylate, t-butyl acrylate, acrylamide, 2-hydroxy ethyl methacrylate, methyl methacrylate, acrolein, ethyl methacrylate, acryloyl chloride and phenyl acrylate.

The term "norbornenes" is meant to include norbornene, as well as norbornene derivatives, such as norbomadiene and compounds conforming to the general formulas 5-norbornene-2-$R^{1a}$, 5-norbornene-2,2-$R^{1a}$, 5-norbornene-3-$R^{1a}$, 5-norbornene-3,3-$R^{1a}$, 5-norbornene-2,3-$R^{1a}$, or 5-norbornene-2-$R^{1a}$-3-$R^{1b}$, where $R^{1a}$ and $R^{1b}$, independently, represent an alkyl or aryl group. Specific, non-limiting examples of norbornenes contemplated for use in the present invention include norbornene, 5-norbornene-2-methanol, cis-5-norbornene-endo-2,3-dicarboxylic anhydride, 5-norbornene-2,2-dimethanol, 5-norbornen-2-ol, norbornadiene, 5-norbornene-2,3-diphenyl, cis-5-norbornene-endo-2,3-dicarboxylic acid dimethyl ester, 5-norbornen-2-yl-acetate and 5-norbornene-2-carboxyaldehyde.

The Pd(II)-based catalyst system of the present invention is a dimer catalyst that may be characterized by the formula $[(L)Pd(R)(X)]_2$. In this dimer catalyst, L is a monodentate phosphorus or nitrogen ligand. In general, suitable monodentate phosphorus ligands are those that conform to the formula $R^2_3P$, where $R^2$ is alkyl and/or aryl group. Non-limiting examples of such monodentate phosphorus ligands include triphenyl phosphine ($PPh_3$), tricyclohexyl phosphine ($PCy_3$), trimethyl phosphine ($PMe_3$), triethyl phosphine ($PEt_3$), tri-n-propyl phosphine ($P(n-Pr)_3$), tri-n-butyl phosphine ($P(n-Bu)_3$), tri-t-butyl phosphine ($P(t-Bu)_3$) and tri-p-tolyl phosphine ($P(p-Tol)_3$). Specific, non-limiting examples of mixed alkyl and aryl phosphines that are suitable for use in the invention include methyldiphenyl phosphine ($P(Me)(Ph)_2$), phenyldimethyl phosphine ($PPh(Me)_2$), ethyldiphenyl phosphine ($P(Et)(Ph)_2$), and phenyldiethyl phosphine ($PPh(Et)_2$).

Generally, monodentate nitrogen ligands which may be used in the present invention are aromatic or heterocyclic amines, such as pyridine, t-butyl pyridine, aniline, trimethyl aniline and imidazole, or compounds that conform to the formula $R_3N$, where $R_3$ is an alkyl group, such as methyl ($CH_3$), ethyl ($CH_2CH_3$), propyl ($CH_2CH_2CH_3$), n-butyl ($CH_2CH_2CH_2CH_3$), or t-butyl ($C-(CH_3)_3$), or an aryl group, such as phenyl ($C_6H_6$) or p-tolyl ($C_7H_8$).

X is an anionic group, such as chlorine or bromine, or a carboxylate, such as acetate, propionate, trifluoroacetate, and benzoate; and R is an alkyl group, such as methyl ($CH_3$), ethyl ($CH_2CH_3$), propyl ($CH_2CH_2CH_3$), n-butyl ($CH_2CH_2CH_2CH_3$), or t-butyl ($C-(CH_3)_3$), or an aryl group, such as phenyl ($C_6H_6$) or p-tolyl ($C_7H_8$).

Typically, the catalyst is formed by reaction of 1 equivalent of the monodentate ligand with [(1,5-cyclooctadiene)Pd(Me)(X)] in situ, as illustrated by the equation (using X=chlorine):

Catalyst formation may be monitored by $^1H$ and $^{31}P\{^1H\}$ NMR. For the $PCy_3$ analog, the movement of the methyl signal in the proton spectrum from a singlet at 1.12 ppm in the starting material to a triplet at 0.11 ppm in the dimer upon addition of 1 equivalent $PCy_3$ indicates the formation of the desired product. Additionally, the appearance of uncoordinated 1,5-cyclooctadiene signals at 5.55 and 2.34 ppm in the proton NMR and a 25.6 ppm $^{31}P\{^1H\}$ NMR signal for $[(PCy_3)Pd(Me)(Cl)]_2$ are observed.

The relevance of the alkyl (or aryl) group in the present dimer catalyst system was explored by attempting to homopolymerize methyl acrylate using a dimer catalyst that was devoid of alkyl (or aryl) groups. It was found that methyl acrylate would not polymerize when reacted in the presence of a Pd(II) catalyst that was prepared by reacting $[(1,5-cyclooctadiene)Pd(Cl)_2]$ with 1 equivalent of tricyclohexyl phosphine ($PCy_3$). This indicated that the alkyl (or aryl) group is essential to the polymerization mechanism.

The copolymers of the present invention may be tailored in norbornene to acrylate ratio by varying the ratio of the respective monomers in the reaction mixture and by varying the ligands utilized in the catalyst system. Typically, the ratio of norbornene monomer to acrylate monomer in the starting mixture is from about 100:1 to about 1:100. In preferred aspects of the invention, the ratio of norbornene monomer to acrylate monomer that is added to the reactor is from about 10:1 to about 1:10. By varying the ratio of the norbornene monomer to acrylate monomer in the starting mixture copolymers having a very wide range of acrylate-derived units and norbornene-derived units can be prepared. For example, copolymers containing from about 5 to about 95 mole % acrylate-derived units and from about 95 to about 5 mole % norbornene-derived units may be prepared in accordance with this invention. In certain preferred aspects, copolymers containing from about 15 to about 90 mole % acrylate-derived units and from about 85 to about 10 mole % norbornene-derived units are prepared; and in other preferred aspects, copolymers containing from about 25 to about 80 mole % acrylate-derived units and from about 75 to about 20 mole % norbornene-derived units are prepared. In still other preferred aspects, copolymers containing from about 35 to about 55 mole % acrylate-derived units and from about 45 to about 65 mole % norbornene-derived units are prepared.

The polymerization preferably is carried out in the liquid phase using a solvent, such as dichloromethane ($CH_2Cl_2$), benzene ($C_6H_6$), chlorobenzene ($C_6H_5Cl$) or hexane ($C_6H_{14}$). Other solvents that may be used as the polymerization medium include, for example, pentane ($C_5H_{12}$), toluene ($C_7H_8$), and chloroform ($CHCl_3$).

The polymerization in accordance with this invention may be carried out at temperatures ranging from about 0 to about 200° C. Typically, however, the polymerization will be carried out at a temperature of from about 30 to about 80° C., e.g., about 50° C. The pressure at which the polymerization is carried out is not critical.

The various aspects of the invention will be appreciated more fully in light of the following illustrative examples:

EXAMPLE 1

Homopolymerization of Methyl Acrylate: [(1,5-cyclooctadiene)Pd-(Me)-(Cl)]/PPh$_3$/methyl acrylate in CH$_2$Cl$_2$ In a glove box, under an inert atmosphere (nitrogen), [(1,5-cyclooctadiene)Pd-(Me)(Cl)] (0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of CH$_2$Cl$_2$, and the mixture was gently swirled to dissolve the starting materials and to form a clear, colorless solution. Next, 1 g (1.2×10$^{-2}$ mol) of methyl acrylate was added to the solution and the flask was sealed with a rubber septum and placed in a 50° C. oil bath for 24 hours. Polymer product was obtained by precipitating in methanol, then decanting off liquid and drying under reduced pressure at room temperature. The polymer product was Soxhlet extracted in ether for 16 hours and dried under a vacuum. 0.910 g of polymer product was obtained. The product had a number average molecular weight (M$_n$)=510,000 and a molecular weight distribution (M$_w$/M$_n$, where M$_w$ is the weight average molecular weight)=1.3.

EXAMPLE 2

Homopolymerization of Norbornene: [(1,5-cyclooctadiene)Pd(Me)-(Cl)]/PPh$_3$/norbornene in benzene In a glove box, under an inert atmosphere (nitrogen), [(1,5-cyclooctadiene)Pd-(Me)(Cl)] (0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of benzene, and the mixture was gently swirled to dissolve the starting materials and to form a clear, colorless solution. Next, 1 g (1.06×10$^{-2}$ mol) of norbornene was added to the solution, which changed to transparent yellow in appearance. The flask was then sealed with a rubber septum and placed in a 50° C. oil bath for 24 hours. Polymer product was obtained by precipitating in methanol, then decanting off liquid and drying under reduced pressure at room temperature. 0.983 g of polymer product was obtained. The product had a number average molecular weight (M$_n$)=2,000.

EXAMPLE 3

Homopolymerization of Methyl Acrylate: [(1,5-cyclooctadiene)Pd-(Me)(Cl)]PCy$_3$/methyl acrylate in CH$_2$Cl$_2$ The procedure of Example 1 was followed, except that PCy$_3$ (0.21 g, 7.56×10$^{-5}$ mol) was added to the reaction flask instead of PPh$_3$. 0.784 g of polymer product was obtained.

EXAMPLE 4

Homopolymerization of Norbornene: [(1,5-cyclooctadiene)Pd(Me)-(Cl)]/PCy$_3$/norbornene in benzene The procedure of Example 2 was followed, except that PCy$_3$ (0.21 g, 7.56×10$^{-5}$ mol) was added to the reaction flask instead of PPh$_3$. 0.803 g of polymer product was obtained.

EXAMPLE 5

Homopolymerization of Methyl Acrylate: [(1,5-cyclooctadiene)Pd-(Me)(Cl)]/PMe$_3$/methyl acrylate in CH$_2$Cl$_2$ The procedure of Example 1 was followed, except that one drop of a 1M solution PMe$_3$ in toluene was added to the reaction flask instead of PPh$_3$. 0.420 g of polymer product was obtained.

EXAMPLE 6

Homopolymerization of Norbornene: [(1,5-cyclooctadiene)Pd(Me)-(Cl)]/PMe$_3$/norbornene in benzene The procedure of Example 2 was followed, except that one drop of a 1M solution of PMe$_3$ in toluene was added to the reaction flask instead of PPh$_3$. 0.861 g of polymer product was obtained.

EXAMPLE 7

Homopolymerization of Methyl Acrylate: [(1,5-cyclooctadiene)Pd-(Me)(Cl)]/pyridine/methyl acrylate in CH$_2$Cl$_2$ In a glove box, under an inert atmosphere (nitrogen), [(1,5-cyclooctadiene)Pd-(Me)(Cl)] (0.035 g, 1.32×10$^{-4}$ mol) was placed into a 25 mL round bottom flask. To this was added 1 equivalent of pyridine (0.010 g, 1.32×10$^{-4}$ mol), followed by 3 mL of CH$_2$Cl$_2$, and the mixture was gently swirled to dissolve the starting materials and to form a clear, colorless solution. Next, 1 g (1.2×10$^{-2}$ mol) of methyl acrylate was added to the solution and the flask was sealed with a rubber septum and placed in a 50° C. oil bath for 24 hours. Polymer product was obtained by precipitating in methanol, then decanting off liquid and drying under reduced pressure at room temperature. 0.490 g of polymer product was obtained.

EXAMPLE 8

Homopolymerization of Norbornene: [(1,5-cyclooctadiene)Pd-(Me)(Cl)]/pyridine/norbornene in benzene In a glove box, under an inert atmosphere (nitrogen), [(1,5-cyclooctadiene)-Pd(Me)(Cl)] (0.035 g, 1.32×10$^{-4}$ mol) was placed into a 25 mL round bottom flask. To this was added 1 equivalent of pyridine (0.010 g, 1.32×10$^{-4}$ mol), followed by 3 mL of benzene, and the mixture was gently swirled to dissolve the starting materials, thus forming a clear, colorless solution. Next, 1 g (1.2×10$^{-2}$ mol) of norbornene was added to the solution, which changed to transparent yellow in appearance. The flask was then sealed with a rubber septum and placed in a 50° C. oil bath for 24 hours. Polymer product was obtained by precipitating in methanol, then decanting off liquid and drying under reduced pressure at room temperature. 0.643 g of polymer product was obtained.

EXAMPLE 9

Copolymer of Methyl Acrylate and Norbornene; [(1,5-cyclooctadiene)-Pd(Me)(Cl)]/PPh$_3$/methyl acrylate/norbornene in CH$_2$Cl$_2$(10:1 methyl acrylate:norbornene)

In a glove box, under an inert atmosphere (nitrogen), [(1,5-cyclooctadiene)-Pd(Me)(Cl)] (0.020 g, 7.56×10$^{-5}$ mol) was placed into a 25 mL round bottom flask. To this was added 1 equivalent of $PPh_3$ (0.020 g, $7.56\times10^{-5}$ mol), followed by 3 mL of $CH_2Cl_2$, and the mixture was gently swirled to dissolve the starting materials, thus forming a clear, colorless solution. Next, 1.000 g ($1.2\times10^{-2}$ mol) of methyl acrylate and 0.113 g ($1.2\times10^{-3}$ mol) of norbornene were dissolved in each other in a beaker, and the resulting solution was added to the flask containing the dissolved [(1,5-cyclooctadiene)Pd(Me)(Cl)] and $PPh_3$. The flask was sealed with a rubber septum and placed in a 50° C. oil bath for 24 hours. Copolymer product was obtained by precipitating in methanol, then decanting off liquid and drying under reduced pressure at room temperature. The copolymer product was Soxhlet extracted in ether for 16 hours and dried under a vacuum to obtain 0.120 g product. The product had a number average molecular weight ($M_n$)=429,700 and a molecular weight distribution ($M_w/M_n$)=2.1.

EXAMPLE 10

Copolymer of Methyl Acrylate and Norbornene; [(1,5-cyclooctadiene)-Pd(Me)(Cl)]/$PPh_3$/methyl acrylate/norbornene in $CH_2Cl_2$ (5:1 methyl acrylate:norbornene)

The procedure of Example 9 was repeated, except that 0.800 g ($9.3\times10^{-3}$ mol) of methyl acrylate and 0.175 g ($1.86\times10^{-3}$ mol) of norbornene were added to the reaction solution. 0.630 g of copolymer product was obtained. The product had a number average molecular weight ($M_n$)=380,000 and a molecular weight distribution ($M_w/M_n$)=2.0.

EXAMPLE 11

Copolymer of Methyl Acrylate and Norbornene; [(1,5-cyclooctadiene)-Pd(Me)(Cl)]/PPh.sub.3/methyl acrylate/norbornene in $CH_2Cl_2$ (1:1 methyl acrylate:norbornene)

The procedure of Example 9 was repeated, except that 1.000 g ($1.2\times10^{-2}$ mol) of methyl acrylate and 1.130 g ($1.2\times10^{-2}$ mol) of norbornene were added to the reaction solution. 0.770 g of copolymer product was obtained. The product had a number average molecular weight ($M_n$)=60,400 and a molecular weight distribution ($M_w/M_n$)=1.7. The product had a molar ratio of methyl methacrylate:norbornene of 1:0.27 (~21.2 mole % norbornene), as determined by $^1$H NMR integration.

EXAMPLE 12

Copolymer of Methyl Acrylate and Norbornene; [(1,5-cyclooctadiene)-Pd(Me)(Cl)]/$PPh_3$/methyl acrylate/norbornene in $CH_2Cl_2$ (1:5 methyl acrylate:norbornene)

The procedure of Example 9 was repeated, except that 0.183 g ($2.13\times10^{-3}$ mol) of methyl acrylate and 1.000 g ($1.06\times10^{-2}$ mol) of norbornene were added to the reaction solution. 0.160 g of copolymer product was obtained. The product had a number average molecular weight ($M_n$)=122,000 and a molecular weight distribution ($M_w/M_n$)=1.5. The product had a molar ratio of methyl methacrylate:norbornene of 1:0.54 (~35.1 mole % norbornene), as determined by $_1$H NMR integration.

EXAMPLE 13

Copolymer of Methyl Acrylate and Norbornene; [(1,5-cyclooctadiene)-Pd(Me)(Cl)]/$PPh_3$/methyl acrylate/norbornene in $CH_2Cl_2$ (1:10 methyl acrylate:norbornene).

The procedure of Example 9 was repeated, except that 0.082 g ($9.57\times10^{-4}$ mol) of methyl acrylate and 0.900 g ($9.57\times10^{-3}$ mol) of norbornene were added to the reaction solution. 0.130 g of copolymer product was obtained. The product had a number average molecular weight ($M_n$)=274,400 and a molecular weight distribution ($M_w/M_n$)=1.5. The product had a molar ratio of methyl methacrylate:norbornene of 1:1.55 (~67.8 mole % norbornene), as determined by $^1$H NMR integration.

EXAMPLE 14

Copolymer of Methyl Acrylate and Norbornene; [(1,5-cyclooctadiene)-Pd(Me)(Cl)]/$PCy_3$/methyl acrylate/norbornene in $CH_2Cl_2$ (10:1 methyl acrylate:norbornene)

In a glove box, under an inert atmosphere (nitrogen), [(1,5-cyclooctadiene)Pd(Me)(Cl)] (0.020 g, $7.56\times10^{-5}$ mol) was placed into a 25 mL round bottom flask. To this was added 1 equivalent of $PCy_3$ (0.021 g, $7.93\times10^{-5}$ mol), followed by 3 mL of $CH_2Cl_2$, and the mixture was gently swirled to dissolve the starting materials, thus forming a clear, colorless solution. Next, 1.500 g ($1.7\times10^{-2}$ mol) of methyl acrylate and 0.160 g ($1.7\times10^{-3}$ mol) of norbornene were dissolved in each other in a beaker, and the resulting solution was added to the flask containing the dissolved [(1,5-cyclooctadiene)Pd(Me)(Cl)] and $PCy_3$. The flask was sealed with a rubber septum and placed in a 50° C. oil bath for 24 hours. Copolymer product was obtained by precipitating in methanol, then decanting off liquid and drying under reduced pressure at room temperature. The copolymer product was Soxhlet extracted in ether for 16 hours and dried under a vacuum to obtain 0.410 g product. The product had a number average molecular weight ($M_n$)=429,700 and a molecular weight distribution ($M_w/M_n$)=2.1. The product had a molar ratio of methyl methacrylate:norbornene of 1:0.09 (~8.3 mole % norbornene), as determined by $^1$H NMR integration.

EXAMPLE 15

Copolymer of Methyl Acrylate and Norbornene; [(1,5-cyclooctadiene)-Pd(Me)(Cl)]/$PCy_3$/methyl acrylate/norbornene in $CH_2Cl_2$ (5:1 methyl acrylate:norbornene)

The procedure of Example 14 was repeated, except that 1.500 g ($1.7\times10^{-2}$ mol) of methyl acrylate and 0.328 g ($3.49\times10^{-3}$ mol) of norbornene were added to the reaction solution. 0.440 of copolymer product was obtained. The product had a number average molecular weight ($M_n$)=238,500 and a molecular weight distribution ($M_w/M_n$)=1.5. The product had a molar ratio of methyl methacrylate:norbornene of 1:0.11 (~9.9 mole % norbornene), as determined by $^1$H NMR integration.

EXAMPLE 16

Copolymer of Methyl Acrylate and Norbornene; [(1,5-cyclooctadiene)-Pd(Me)(Cl)]/PCy.sub.3 /methyl acrylate/norbornene in $CH_2Cl_2$ (1:1 methyl acrylate:norbornene)

The procedure of Example 14 was repeated, except that 1.00 g ($1.2\times10^{-2}$ mol) of methyl acrylate and 1.140 g ($1.2\times10^{-2mol}$) of norbornene were added to the reaction solution. 0.480 g of copolymer product was obtained. The product had a number average molecular weight ($M_n$)=39,800 and a molecular weight distribution ($M_w/M_n$)=1.8. The product had a molar ratio of methyl methacrylate:norbornene of 1:0.34 (~25.7 mole % norbornene), as determined by $^1$H NMR integration.

EXAMPLE 17

Copolymer of Methyl Acrylate and Norbornene; [(1,5-cyclooctadiene)-Pd(Me)(Cl)]/PCy$_3$/methyl acrylate/norbornene in CH$_2$Cl$_2$ (1:5 methyl acrylate:norbornene)

The procedure of Example 14 was repeated, except that 0.183 g (2.13×10$^{-3}$ mol) of methyl acrylate and 1.000 g (1.06×10$^{-2}$ mol) of norbornene were added to the reaction solution. 0.160 g of copolymer product was obtained. The product had a number average molecular weight (M$_n$)=24,000 and a molecular weight distribution (M$_w$/M$_n$)=1.5.

EXAMPLE 18

Copolymer of Methyl Acrylate and Norbornene; [(1,5-cyclooctadiene)-Pd(Me)(Cl)]/PCy$_3$/methyl acrylate/norbornene in CH$_2$Cl$_2$ (1:10 methyl acrylate:norbornene)

The procedure of Example 14 was repeated, except that 0.137 g (1.60×10$^{-3}$ mol) of methyl acrylate and 1.500 g (1.6×10$^{-2}$ mol) of norbornene were added to the reaction solution. 0.040 g of copolymer product was obtained. The product had a number average molecular weight (M$_n$)=1,000.

EXAMPLE 19

Copolymer of Methyl Acrylate and Norbornene; [(1,5-cyclooctadiene)-Pd(Me)(Cl)]/PMe$_3$/methyl acrylate/norbornene in CH$_2$Cl$_2$ (10:1 methyl acrylate:norbornene)

In a glove box, under an inert atmosphere (nitrogen), [(1,5-cyclooctadiene)Pd(Me)(Cl)] (0.020 g, 7.56×10$^{-5}$ mol) was placed into a 25 mL round bottom flask. To this was added 1 drop of 1M PMe$_3$ in toluene, followed by 3 mL of CH$_2$Cl$_2$. The mixture was gently swirled to dissolve the starting materials, thus forming a clear, colorless solution. Next, 1.500 g (1.7×10$^{-2}$ mol) of methyl acrylate and 0.160 g (1.7×10$^3$ mol) of norbornene were dissolved in each other in a beaker, and the resulting solution was added to the flask containing the [(1,5-cyclooctadiene)Pd(Me)(Cl)] and PMe$_3$. The flask was sealed with a rubber septum and placed in a 50° C. oil bath for 24 hours. Copolymer product was obtained by precipitating in methanol, then dacanting off liquid and drying under reduced pressure at room temperature. The copolymer product was Soxhlet extracted in ether for 16 hours and dried under a vacuum. 0.230 g of copolymer product was obtained. The product had a number average molecular weight (M$_n$)=363,700 and a molecular weight distribution (M$_w$/M$_n$)=1.4.

EXAMPLE 20

Copolymer of Methyl Acrylate and Norbornene; [(1,5-cyclooetadiene)-Pd(Me)(Cl)]/PMe$_3$/methyl acrylate/norbornene in CH$_2$Cl$_2$ (5:1 methyl acrylate:norbornene)

The procedure of Example 19 was repeated, except that 1.500 g (1.7×10$^{-2}$ mol) of methyl acrylate and 0.328 g (3.49×10$^{-3}$ mol) of norbornene were added to the reaction solution. 0.440 g of copolymer product was obtained. The product had a number average molecular weight (M$_n$)=249,500 and a molecular weight distribution (M$_w$/M$_n$)=1.6.

EXAMPLE 21

Copolymer of Methyl Acrylate and Norbornene; [(1,5-cyclooctadiene)-Pd(Me)(Cl)]/PMe$_3$/methyl acrylate/norbornene in CH$_2$Cl$_2$ (1:1 methyl acrylate:norbornene)

The procedure of Example 19 was repeated, except that 1.00 g (1.2×10$^{-2}$ mol) of methyl acrylate and 1.140 g (1.2×10$^{-2}$ mol) of norbornene were added to the reaction solution. 0.480 g of copolymer product was obtained. The product had a number average molecular weight (M$_n$)=86,400 and a molecular weight distribution (M$_w$/M$_n$)=1.6.

EXAMPLE 22

Copolymer of Methyl Acrylate and Norbornene; [(1,5-cyclooctadiene)-Pd(Me)(Cl)]/PMe$_3$/methyl acrylate/norbornene in CH$_2$Cl$_2$ (1:5 methyl acrylate:norbornene)

The procedure of Example 19 was repeated, except that 0.183 g (2.13×10$^{-3}$ mol) of methyl acrylate and 1.000 g (1.06×10$^{-2}$ mol) of norbornene were added to the reaction solution. 0.206 g of copolymer product was obtained. The product had a number average molecular weight (M$_n$)–800.

EXAMPLE 23

Copolymer of Methyl Acrylate and Norbornene; [(1,5-cyclooctadiene)-Pd(Me)(Cl)]/PMe$_3$/methyl acrylate/norbornene in CH$_2$Cl$_2$ (1:10 methyl acrylate:norbornene)

The procedure of Example 14 was repeated, except that 0.137 g (1.60×10$^{-3}$ mol) of methyl acrylate and 1.500 g (1.6×10$^{-2}$ mol) of norbornene were added to the reaction solution. 0.040 g of copolymer product was obtained. The product had a number average molecular weight (M$_n$)=800.

EXAMPLE 24

Copolymer of Methyl Acrylate and Norbornene; [(1,5-cyclooctadiene)-Pd(Me)(Cl)]/pyridine/methyl acrylate/norbornene in CH$_2$Cl$_2$ (10:1 methyl acrylate:norbornene)

In a glove box, under an inert atmosphere (nitrogen), [(1,5-cyclooctadiene)Pd(Me)(Cl)] (0.035 g, 1.32×10$^{-4}$ mol) was placed into a 25 mL round bottom flask. To this was added 1 equivalent of pyridine (0.010 g, 1.32×10$^{-4}$ mol), followed by 3 mL of CH$_2$Cl$_2$. The mixture was gently swirled to dissolve the starting materials, thus forming a clear, colorless solution. Next, 1.500 g (1.7×10$^{-2}$ mol) of methyl acrylate and 0.160 g (1.7×10$^{-3}$ mol) of norbornene were dissolved in each other in a beaker, and the resulting solution was added to the flask containing the dissolved [(1,5-cyclooctadiene)Pd(Me)(Cl)] and pyridine. The flask was sealed with a rubber septum and placed in a 50° C. oil bath for 24 hours. Copolymer product was obtained by precipitating in methanol, then decanting off liquid and drying under reduced pressure at room temperature. The copolymer product was Soxhlet extracted in ether for 16 hours and dried under a vacuum. The product had a number average molecular weight (M")=23,800 and a molecular weight distribution (M$_w$/M$_n$)=1.8.

EXAMPLE 25

Copolymer of Methyl Acrylate and Norbornene; [(1,5-cyclooctadiene)-Pd(Me)(Cl)]/pyridine/methyl acrylate/norbornene in CH$_2$Cl$_2$ (5:1 methyl acrylate:norbornene)

The procedure of Example 25 was repeated, except that 1.500 g (1.7×10$^{-2}$ mol) of methyl acrylate and 0.328 g (3.49×10$^{-3}$ mol) of norbornene were added to the reaction solution. 0.046 g of copolymer product was obtained. The product had a number average molecular weight $M_n$=75,300 and a molecular weight distribution ($M_w/M_n$)=1.4.

EXAMPLE 26

Copolymer of Methyl Acrylate and Norbornene; [(1,5-cyclooctadiene)-Pd(Me)(Cl)]/pyridine/methyl acrylate/norbornene in $CH_2Cl_2$ (1:1 methyl acrylate:norbornene)

The procedure of Example 25 was repeated, except that 1.00 g (1.2×10$^{-2}$ mol) of methyl acrylate and 1.140 g (1.2×10$^{-2}$ mol) of norbornene were added to the reaction solution. The product had a number average molecular weight ($M_n$)=8,400 and a molecular weight distribution ($M_w/M_n$)=2.0. The product had a molar ratio of methyl methacrylate:norbornene of 1:0.23 (~18.7 mole % norbornene), as determined by $^1$H NMR integration.

EXAMPLE 27

Copolymer of Methyl Acrylate and Norbornene; [(1,5-cyclooctadiene)-Pd(Me)(Cl)]/pyridine/methyl acrylate/norbornene in $CH_2Cl_2$ (1:5 methyl acrylate:norbornene)

The procedure of Example 25 was repeated, except that 0.183 g (2.13×10$^{-3}$ mol) of methyl acrylate and 1.000 g (1.06×10$^{-2}$ mol) of norbornene were added to the reaction solution. 0.086 g of copolymer product was obtained. The product had a number average molecular weight ($M_n$)=75,200 and a molecular weight distribution ($M_w/M_n$)=1.5. The product had a molar ratio of methyl methacrylate:norbornene of 1:0.57 (~36.3 mole % norbornene), as determined by $^1$H NMR integration.

EXAMPLE 28

Copolymer of Methyl Acrylate and Norbornene; [(1,5-cyclooctadiene)-Pd(Me)(Cl)]/pyridine/methyl acrylate/norbornene in $CH_2Cl_2$ (1:10 methyl acrylate:norbornene)

The procedure of Example 25 was repeated, except that 0.082 g (9.57×10$^{-4}$ mol) of methyl acrylate and 1.000 g (1.06 ×10$^{-2}$ mol) of norbornene were added to the reaction solution. 0.072 g of copolymer product was obtained. The product had a number average molecular weight ($M_n$)=26,100 and a molecular weight distribution ($M_w/M_n$)=1.7. The product had a molar ratio of methyl methacrylate:norbornene of 1:0.71 (~41.5 mole % norbornene), as determined by $^1$H NMR integration.

EXAMPLE 29

Homopolymerization of n-Butyl Acrylate: [(1,5-cyclooctadiene)-Pd(Me)(Cl)]/PPh$_3$/n-butyl acrylate in chlorobenzene In a glove box, under an inert atmosphere (nitrogen), [(1,5-cyclooctadiene)Pd(Me)(Cl)] (0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of chlorobenzene ($C_6H_5Cl$), and the mixture was gently swirled to dissolve the starting materials, thus forming a clear, colorless solution. Next, 2 g of n-butyl acrylate was added to the solution and the flask was sealed with a rubber septum and placed in a 50° C. oil bath for 24 hours. 0.420 g of polymer product was obtained by precipitating in methanol, then decanting off liquid and drying under reduced pressure at room temperature. The product had a number average molecular weight ($M_n$)=627,000 and a molecular weight distribution ($M_w/M_n$)=1.2.

EXAMPLE 30

Copolymerization of n-Butyl Acrylate and Norbornene: [(1,5-cyclooctadiene)Pd(Me)(Cl)]/PPh$_3$/n-butyl acrylate/norbornene in chlorobenzene (1:1.36 n-butyl acrylate:norbornene).

In a glove box, under an inert atmosphere (nitrogen), [(1,5-cyclooctadiene)Pd(Me)(Cl)] (0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of chlorobenzene, and the mixture was gently swirled to dissolve the starting materials, thus forming a clear, colorless solution. Next, 1.000 g (7.81×10$^{-3}$ mol) of n-butyl acrylate and 1.000 g (1.06×10$_{-2}$ mol) of norbornene were added to the solution. The flask was then sealed with a rubber septum and placed in a 50° C. oil bath for 24 hours. 0.356 g of copolymer product was obtained by precipitating in methanol, and then decanting off liquid and drying under reduced pressure at room temperature. The product had a number average molecular weight ($M_n$)=267,800 and a molecular weight distribution ($M_w/M_n$)=1.5.

EXAMPLE 31

Homopolymerization of t-Butyl Acrylate: [(1,5-cyclooctadiene)-Pd(Me)(Cl)]/PPh$_3$/t-butyl acrylate in chlorobenzene.

In a glove box, under an inert atmosphere (nitrogen), [(1,5-cyclooctadiene)-Pd(Me)(Cl)] (0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 ML of chlorobenzene ($C_6H_5Cl$), and the mixture was gently swirled to dissolve the starting materials, thus forming a clear, colorless solution. Next, 1.000 g (7.81×10$^{-3}$ mol) of t-butyl acrylate was added to the solution and the flask was sealed with a rubber septum and placed in a 50° C. oil bath for 24 hours. Polymer product was obtained by precipitating in methanol, and then decanting off liquid and drying under reduced pressure at room temperature. The product had a number average molecular weight ($M_n$)=550,000 and a molecular weight distribution ($M_w/M_n$)=1.2.

EXAMPLE 32

Copolymerization of n-Butyl Acrylate and Norbornene: [(1,5-cyclo-octadiene)Pd(Me)(Cl)]/PPh$_3$]/t-butyl acrylate/norbornene in chlorobenzene (1:1 t-butyl acrylate:norbornene).

In a glove box, under an inert atmosphere (nitrogen), [(1,5-cyclooctadiene)Pd(Me)(Cl)] (0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 ML of chlorobenzene, and the mixture was gently swirled to dissolve the starting materials, thus forming a clear, colorless solution. Next, 1.000 g (7.81×10$^{-3}$ mol) of t-butyl acrylate and 1.000 g (1.06×10$^{-2}$ mol) of norbornene were added to the solution. The flask was then sealed with a rubber septum and placed in a 50° C. oil bath for 24 hours. Copolymer product was obtained by precipitating in methanol, then decanting off liquid and drying under reduced pressure at room temperature

EXAMPLE 33

Homopolymerization of n-Butyl Acrylate: [(1,5-cyclooctadiene)-Pd(Me)(Cl)]/PPh$_3$/n-butyl acrylate in hexane In a glove box, under an inert atmosphere (nitrogen), [(1,5-cyclooctadiene)-Pd(Me)(Cl)] (0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of hexane (C$_6$H$_{14}$), and the mixture was gently swirled to dissolve the starting materials, thus forming a clear, colorless solution. Next, 2 g (1.56×10$^{-2}$ mol) of butyl acrylate was added to the solution and the flask was sealed with a rubber septum and placed in a 50° C. oil bath for 24 hours. Polymer product was obtained by precipitating in methanol, then decanting off liquid and drying under reduced pressure at room temperature. The product had a number average molecular weight (M$_n$)=127,000 and a molecular weight distribution (M$_w$/M$_n$)=1.3.

EXAMPLE 34

Homopolymerization of Methyl Acrylate: [(1,5-cyclooctadiene)-Pd(Me)(Cl)]/PPh$_3$ methyl methacrylate in benzene In a glove box, under an inert atmosphere (nitrogen), [(1,5-cyclooctadiene)-Pd(Me)(Cl)] (0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of benzene (C$_6$H$_6$), and the mixture was gently swirled to dissolve the starting materials, thus forming a clear, colorless solution. Next, 2 g of methyl methacrylate was added to the solution and the flask was sealed with a rubber septum stirred at 50° C. for 24 hours. Polymer product was obtained by precipitating in methanol, then decanting off liquid and drying under reduced pressure at room temperature. 0.025 g of polymer product was obtained. The product had a number average molecular weight (M$_n$)=193,000 and a molecular weight distribution (M$_w$/M$_n$)=1.5.

EXAMPLE 35

Homopolymerization of Ethyl Acrylate: [(1,5-cyclooctadiene)-Pd(Me)(Cl)]/PPh$_3$/ethyl acrylate in CH$_2$Cl$_2$ In a glove box, under an inert atmosphere (nitrogen), [(1,5-cyclooctadiene)-Pd(Me)(Cl)](0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of dichloromethane (CH$_2$Cl$_2$), and the mixture was gently swirled to dissolve the starting materials, thus forming a clear, colorless solution. Next, 2 g (2.0×10$^{-2}$ mol) of ethyl acrylate was added to the solution and the flask was sealed with a rubber septum stirred at 50° C. for 24 hours. Polymer product was obtained by precipitating in methanol, then decanting off liquid and drying under reduced pressure at room temperature. 0.837 g of polymer product was obtained. The product had a number average molecular weight (M$_n$)=127,000 and a molecular weight distribution (M$_w$/M$_n$)=1.3.

TABLE 1

| Ex. No. | Ligand | Methyl Acrylate/ Norbornene Reactant Molar Ratio | M$_n$ (Daltons) | M$_w$/M$_n$ | Mole % NB |
|---|---|---|---|---|---|
| 9  | PPh$_3$   | 10:1 | 429,700 | 2.1 | — |
| 10 | PPh$_3$   | 5:1  | 380,000 | 2.0 | — |
| 11 | PPh$_3$   | 1:1  | 60,400  | 1.7 | 21.2 |
| 12 | PPh$_3$   | 1:5  | 122,000 | 1.5 | 35.1 |
| 13 | PPh$_3$   | 1:10 | 274,400 | 1.5 | 67.8 |
| 14 | PCy$_3$   | 10:1 | 429,700 | 2.1 | 8.3 |
| 15 | PCy$_3$   | 5:1  | 238,500 | 1.5 | 9.9 |
| 16 | PCy$_3$   | 1:1  | 39,800  | 1.8 | 25.7 |
| 17 | PCy$_3$   | 1:5  | 24,000  | 1.5 | — |
| 18 | PCy$_3$   | 1:10 | 1,000   | —   | — |
| 19 | PMe$_3$   | 10:1 | 363,700 | 1.4 | — |
| 20 | PMe$_3$   | 5:1  | 249,500 | 1.6 | — |
| 21 | PMe$_3$   | 1:1  | 86,400  | 1.6 | — |
| 22 | PMe$_3$   | 1:5  | 800     | —   | — |
| 23 | PMe$_3$   | 1:10 | 800     | —   | — |
| 24 | Pyridine  | 10:1 | 23,800  | 1.8 | — |
| 25 | Pyridine  | 5:1  | 75,300  | 1.4 | — |
| 26 | Pyridine  | 1:1  | 8,400   | 2.0 | 18.7 |
| 27 | Pyridine  | 1:5  | 75,200  | 1.5 | 36.3 |
| 28 | Pyridine  | 1:10 | 26,100  | 1.7 | 41.5 |

As discussed briefly above, and as will be more readily apparent in view of the foregoing examples, the properties of the copolymers can be tailored by varying the ratio of the respective monomers in the reaction mixture and by varying the catalyst system. Varying the ratio of acrylate monomer to norbornene monomer affects the properties of the copolymers in that increasing the ratio of one of the monomer reactants increases its presence in the copolymer product. In instances of a very high ratio of one monomer relative to the other (for example, in 10:1 and 1:10 monomer ratio reactions) the resulting copolymer product consists of long strings of repeating units of the abundant monomer with a few units of the less abundant monomer. Thus, polymer products having a high acrylate content, e.g., high methyl content, tend to be somewhat tacky, whereas polymers having a high norbornene content are white powdery substances. Varying the ligand used in the reaction and/or varying the reactant monomer ratio also affects the molecular weight of the copolymer product. Thus, referring to the examples and Table 1, it can be seen that the mole % of norbornene in the copolymer product increased as the ratio of acrylate monomer to norbornene monomer in the reaction decreased from 10:1 to 1:1 when PPh$_3$ was used as the ligand (Examples 11–13), when PCy$_3$ was used as the ligand (Examples 14–16), and when pyridine was used as the ligand (Examples 26–28). Similarly, it can be seen that the molecular weight of the copolymer product increased as the ratio of acrylate monomer to norbornene monomer increased from 1:1 to 10:1 when PPh$_3$ was used as the ligand (Examples 9–11), when PCy$_3$ was used as the ligand (Examples 14–16), and when PMe$_3$ was used as the ligand (Examples 19–21). It also can be seen that the use of pyridine as the ligand (Examples 24–28) generally resulted in the production of lower molecular weight copolymers, whereas the use of triphenyl phosphine as the ligand (Examples 9–13) tended to produce higher molecular weight copolymers.

While the present invention has been described and exemplified above, it is to be understood that the invention is not limited to the details of the illustrative embodiments and examples, but may be embodied with various changes and modifications which may occur to those skilled in the art, without departing from the spirit and scope of the invention defined in the following claims.

What is claimed is:

1. An acrylate-norbornene copolymer consisting essentially of from about 15 to about 90 mole % acrylate-derived units and from about 85 to about 10 mole percent norbornene-derived units.

2. The copolymer according to claim 1, consisting essentially of from about 25 to about 80 mole % acrylate-derived units and from about 75 to about 20 mole % norbornene-derived units.

3. The copolymer according to claim 1, consisting essentially of from about 35 to about 55 mole % acrylate-derived units and from about 65 to about 45 mole % norbornene-derived units.

4. An acrylate-norbornene copolymer comprising from about 15 to about 90 mole % acrylate-derived units and from about 85 to about 10 mole % norbornene-derived units, said copolymer being substantially free from units that are derived from a compound that can be radical-polymerized with norbornene.

5. The copolymer according to claim 4, wherein said copolymer is substantially free from units that are derived from a member selected from the group consisting of esters of maleic acid and an aliphatic alcohol which contains from 1 to 12 carbon atoms, maleic anhydride, N-substituted maleimides, α-cyanocinnamic acid, esters of α-cyanocinnamic acid and an aliphatic alcohol which contains from 1 to 12 carbon atoms, and esters of fumaric acid and an aliphatic alcohol which contains from 1 to 12 carbon atoms.

* * * * *

UNITED STATES PATENT AND TRADEMARK OFFICE
CERTIFICATE OF CORRECTION

PATENT NO. : 6,593,440 B2
DATED : July 15, 2003
INVENTOR(S) : Sen et al.

It is certified that error appears in the above-identified patent and that said Letters Patent is hereby corrected as shown below:

<u>Title page,</u>
Item [60], Related U.S. Applications Data, delete "09/990,070" and insert -- 09/099,070 --.

Signed and Sealed this

Seventeenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,593,440 B2
DATED : July 15, 2003
INVENTOR(S) : Sen et al.

It is certified that error appears in the above-identified patent and that said Letters Patent is hereby corrected as shown below:

Column 1,
Line 5, add the following paragraph:
-- STATEMENT OF GOVERNMENT INTEREST
This invention was made with support from the Government under Grant/Contract No. DE-FG02-84ER13295. The Government has certain rights in the invention. --.

Signed and Sealed this

Tenth Day of January, 2006

JON W. DUDAS
*Director of the United States Patent and Trademark Office*